June 27, 1967     H. BALL ETAL     3,327,864
FILTER CARTRIDGE UNIT AND POROUS FILTER ELEMENT
FOR USE IN CONNECTION THEREWITH
Filed Feb. 27, 1964
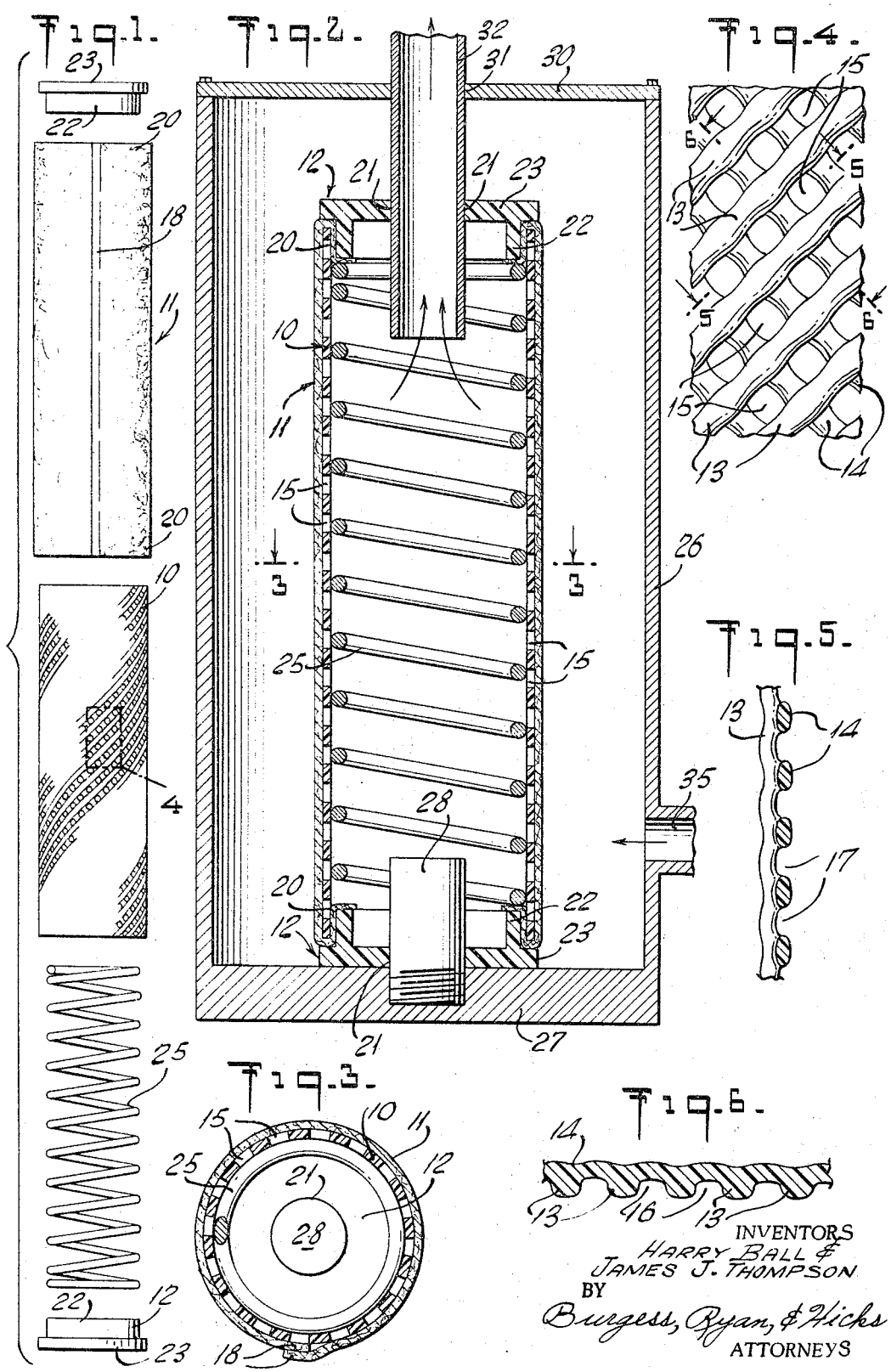
INVENTORS
HARRY BALL &
JAMES J. THOMPSON
BY
Burgess, Ryan, & Hicks
ATTORNEYS

United States Patent Office 3,327,864
Patented June 27, 1967

3,327,864
FILTER CARTRIDGE UNIT AND POROUS FILTER ELEMENT FOR USE IN CONNECTION THEREWITH
Harry Ball, New Brunswick, and James J. Thompson, Newark, N.J., assignors to Technical Fabricators, Inc., Nutley, N.J., a corporation of New Jersey
Filed Feb. 27, 1964, Ser. No. 347,728
3 Claims. (Cl. 210—457)

The present invention relates to improvements in filter cartridge units and in porous filter elements employed in connection therewith.

One object of the present invention is to provide a new and improved filter cartridge unit, (1) which comprises a rigid perforated tubular supporting element and a porous covering filter sleeve or tube element so constructed as to permit the easy assembling and disassembling of the unit, (2) which is comparatively inexpensive to manufacture, and (3) which lends itself readily to manufacture from chemically inert materials to permit its use in connection with chemicals that would attack the usual filter cartridge units.

Another object of the present invention is to provide a new and improved porous filter sleeve element for use in connection with a filter cartridge unit, (1) which affords greater filter efficiency than is possible with corresponding types of filter elements now available, (2) which is constructed to permit its easy replacement on the rigid tubular supporting element of the filter cartridge unit, and (3) which lends itself to manufacture cheaply by mass production methods.

Various other objects of the invention are apparent from the following description, in which FIG. 1 is an exploded view of the components of the filter cartridge unit of the present invention;

FIG. 2 is a vertical section of the filter cartridge unit of the present invention shown in connection with a housing set-up for filtering operation;

FIG. 3 is a transverse section of the filter cartridge unit of the present invention taken on lines 3—3 of FIG. 2;

FIG. 4 is a side elevation of a portion of the tubular supporting element of the filter cartridge unit constituting an enlargement of an area of said element indicated by 4 in FIG. 1; and FIGS. 5 and 6 are sections of the tubular supporting element taken on lines 5—5 and 6—6 of FIG. 4 respectively.

Referring to the drawings, the filter cartridge unit of the present invention comprises a substantially rigid perforated tubular supporting element 10 shown generally cylindrical and open at both ends, a replaceable porous filter sleeve or tube element 11 embracing the supporting element with a snug fit and tucked at the ends inside said supporting element and plugs 12 at the ends of the unit for removably retaining the filter sleeve element in operative position on the tubular supporting element. The tubular supporting element 10 is desirably made of a plastic, such as polypropylene and in the specific embodiment shown constitutes two sets 13 and 14 of rods, one set 13 of these rods being arranged helically in one direction at the same pitch on the outside of the supporting element, the other set 14 being also arranged helically at the same pitch but in the opposite direction on the inside of the supporting element, the rods of the two sets being integrally bonded together at their intercrossings to form a network defining opening spaces 15 constituting holes to which the liquid to be filtered passes. The tubular supporting element 10 can be made by an extrusion process, as for example, that well-known as the "Vexar" process.

The supporting tubular element 10 constructed as described, forms a series of continuous outside helical channels 16 and a series of continuous inside helical channels 17, increasing thereby the flow capacity of the liquid to be filtered through the supporting element.

The filter sleeve element 11 is a porous so-called "non-supported needled felt" desirably made of fibers multi-directionally arranged randomly in the form of a sheet in the manner well-known in the felt art. The fibers can, for example, be polypropylene, Dynel (copolymer of vinyl chloride and vinyl cyanide), cellulose acetate, wool, cellulose or mixtures of these. In the specific embodiment of the invention illustrated, the fibers are of polypropylene and range between .050 to .085 inch in length.

In order to afford maximum porosity while maintaining the necessary particle retention, the felt is free of chemical binders. However, to produce a strong coherent felt structure in the absence of any such binder, the felt is made of a needled batt. The term "needled" indicates that some of the component fibers have been oriented forcibly in the direction perpendicular to the top surface of the fiberous mat or batt.

The extent of particle retention and the degree of porosity of the filter sleeve element 11 are controlled by the extent of compressive pressure applied to the needled felt in the process of manufacturing and to the thickness of the element. The needled batt may be heated prior or during compression in the manufacture of the felt below the softening point of the fibers to control the density of the felt produced. In the specific embodiment shown, the filter sleeve element 11 can have a 5 to 100 micron retention.

In the manufacture of the filter sleeve element 11, the felt sheet made from the needled batt as described, is shaped into cylindrical sleeve form by overlapping the marginal sides 18 of the sheet and securing them together by heat-sealing where the component fibers are thermoplastic, or by securing them together by adhesive where the material of the felt sheet does not lend itself to heat-sealing.

In producing the filter elements 11, a broad continuous needled felt sheet is first produced in the manner described and then slit longitudinally to form elongated felt strips. These strips are then rolled into cylindrical tubular form with their marginal sides overlapping and these marginal sides are heat-sealed or adhesively secured together, depending on the nature of the fibers. The tube so formed is long and is cut into sections to form the individual sleeve elements 11.

Although the sleeve element 11 has form-sustaining rigidity, it is still flexible enough to fit snugly and conformably over the tubular supporting element 10 and flexible enough to permit its end sections 20 to be folded over the ends of the supporting element and tucked inside said supporting element.

The filter sleeve element 11 is removably retained onto the sleeve supporting element 10 by means of similar end plugs 12. These plugs 12 are desirably made of plastic, such as polypropylene, and each has a central cylindrical hole 21 extending therethrough, a cylindrical skirt 22 dimensioned to fit with a tight sealing friction fit into the interior of the filter sleeve element 11, while the ends 20 of the filter element are tucked inside said supporting element, and a flange head 23 adapted to seat against the sleeve-covered end of the tubular supporting element. It is seen that the parts of the filter cartridge unit can be easily assembled and easily disassembled for replacement of the filter sleeve element, when the effectiveness of said sleeve element has been spent.

Since the external pressure of the liquid to be filtered acting on the outside of the cartridge unit may be great, and since the tubular supporting element 10 is of plastic and may require internal bracing to sustain this pressure, this bracing is accomplished by a coil spring 25 inside the supporting element having an external diameter great enough to fit snugly inside said element and to brace the peripheral walls of said element against collapse.

FIG. 2 shows the manner in which the filter cartridge unit of the present invention can be used, as for example, in the processing of foods, in oil refineries and the like. For that purpose, a vessel 26 is provided to house the filter cartridge unit. This vessel 26 has a base wall 27 with a centering pin 28 threaded into said wall and upon which the filter cartridge unit is impaled. This pin 28 is cylindrical and is dimensioned to fit into the hole 21 of the plug 12 at one end of the filter cartridge unit with a tight friction sealing fit, to prevent leakage of the liquid to be filtered from the interior of the filter cartridge unit through the interfaces between the centering pin 28 and the wall of said plug hole and along the outer face of said plug.

The vessel 26 also has a wall 30 opposite the base wall 27, and said wall 30 has a hole 31 in alignment with the centering pin 28 to receive a pipe 32 inserted through said hole and through the hole 21 of the plug 12 adjacent to said vessel hole 31 to form an outlet for the filtrate emerging from the interior of the tubular supporting element 10. The pipe 32 is dimensioned to fit inside this plug hole 21 with a tight friction sealing fit and is joined to the vessel wall 31 by a suitable stuffing gland (not shown) to seal the hole 31 around the pipe 32.

The vessel 26 has an inlet 35 for the liquid to be filtered.

It is seen that the cartridge filter unit of the present invention is very easy to assemble and inexpensive to manufacture and maintain and will afford maximum of capacity with minimum of unit size. Moreover, the filter sleeve element 11 is easy to replace when its filtering life has been consumed, thereby providing a cartridge unit which can be operatively maintained indefinitely by repeated replacements of the sleeve element.

While the invention has been described with particular reference to a specific embodiment, it is to be understood that it is not to be limited thereto but is to be construed broadly and restricted solely by the scope of the appended claims.

What is claimed is:

1. A cartridge filter unit comprising a one-piece felted cylindrical fabric filter sleeve, a substantially rigid cylindrical support sleeve of plastic material for said filter, located inside said filter sleeve, said support sleeve constituting two sets of rods, the rods of each set being helically arranged at the same pitch, and the rods of the two sets being arranged in substantially opposite helical directions, the rods of the two sets being integrally bonded together to form a network with open spaces between the rods, said filter sleeve being of form-sustaining rigidity, but being flexible enough to embrace said support sleeve with snug conforming fit, said filter sleeve being longer than said support sleeve and the ends of said filter sleeve projecting beyond the ends of said support sleeve, the projecting ends of said filter sleeve being folded over the ends of said support sleeve and being tucked into said support sleeve, and removable plastic plugs of circular cross-section at the opposite ends of the unit fitted inside the support sleeve and bearing directly axially against the folded sections of the filter sleeve and directly radially outwardly against the tucked-in ends of said filter sleeve with conforming sealing fits, said plugs being frictionally retained inside said support sleeve to permit removal of said plugs from said sleeve, at least one of said plugs having a center hole.

2. A cartridge filter unit comprising a one-piece felted cylindrical fabric sleeve, a substantially rigid cylindrical support sleeve of plastic material for said filter sleeve, located inside said filter sleeve and having well-defined perforations, said filter sleeve being of form-sustaining rigidity, but being flexible enough to embrace said support sleeve with snug conforming fit, said filter sleeve being longer than said support sleeve and the ends of said filter sleeve projecting beyond the ends of said support sleeve, the projecting ends of said filter sleeve being folded over the ends of said support sleeve and being tucked into said support sleeve, removable plastic plugs of circular cross-section at the opposite ends of the unit fitted inside the support sleeve and bearing directly radially outwardly against the tucked-in ends of said filter sleeve with conforming sealing fits, said plugs being frictionally retained inside said support sleeve to permit removal of said plugs from said sleeve, at least one of said plugs having a center hole, and an internal support for the support sleeve, separable therefrom and having parts distributed substantially throughout the internal area of said support sleeve and closely adjacent the internal periphery of said support sleeve to brace said support sleeve against external pressures applied to said support sleeve, said internal support defining passageways between said parts for the passage of fluid therethrough in the operation of filtering.

3. A cartridge filter unit comprising a one-piece felted cylindrical fabric sleeve, a substantially rigid cylindrical support sleeve of plastic material for said filter sleeve, located inside said filter sleeve and having well-defined perforations, said filter sleeve being of form-sustaining rigidity, but being flexible enough to embrace said support sleeve with snug conforming fit, said filter sleeve being longer than said support sleeve and the ends of said filter sleeve projecting beyond the ends of said support sleeve, the projecting ends of said filter sleeve being folded over the ends of said support sleeve and being tucked into said support sleeve, removable plastic plugs of circular cross-section at the opposite ends of the unit fitted inside the support sleeve and bearing directly radially outwardly against the tucked-in ends of said filter sleeve with conforming sealing fits, said plugs being frictionally retained inside said support sleeve to permit removal of said plugs from said sleeve, at least one of said plugs having a center hole, and an internal support for the support sleeve in the form of a coil spring, separable therefrom.

References Cited

UNITED STATES PATENTS

| | | | |
|---|---|---|---|
| 401,930 | 4/1889 | Cooper et al. | 210—497 X |
| 802,714 | 10/1905 | Smith | 210—489 |
| 2,334,664 | 11/1943 | Wicks | 210—458 |
| 2,788,125 | 4/1957 | Webb | 210—497 X |
| 3,132,099 | 5/1964 | Eilhauer | 210—499 X |
| 3,165,470 | 1/1965 | Giesse et al. | 210—496 X |
| 3,231,092 | 1/1966 | Goldman | 210—457 |

REUBEN FRIEDMAN, *Primary Examiner.*

F. W. MEDLEY, *Assistant Examiner.*